April 30, 1946.  R. A. FELBURG  2,399,218
AIRCRAFT LANDING GEAR
Filed Sept. 7, 1943  3 Sheets-Sheet 1
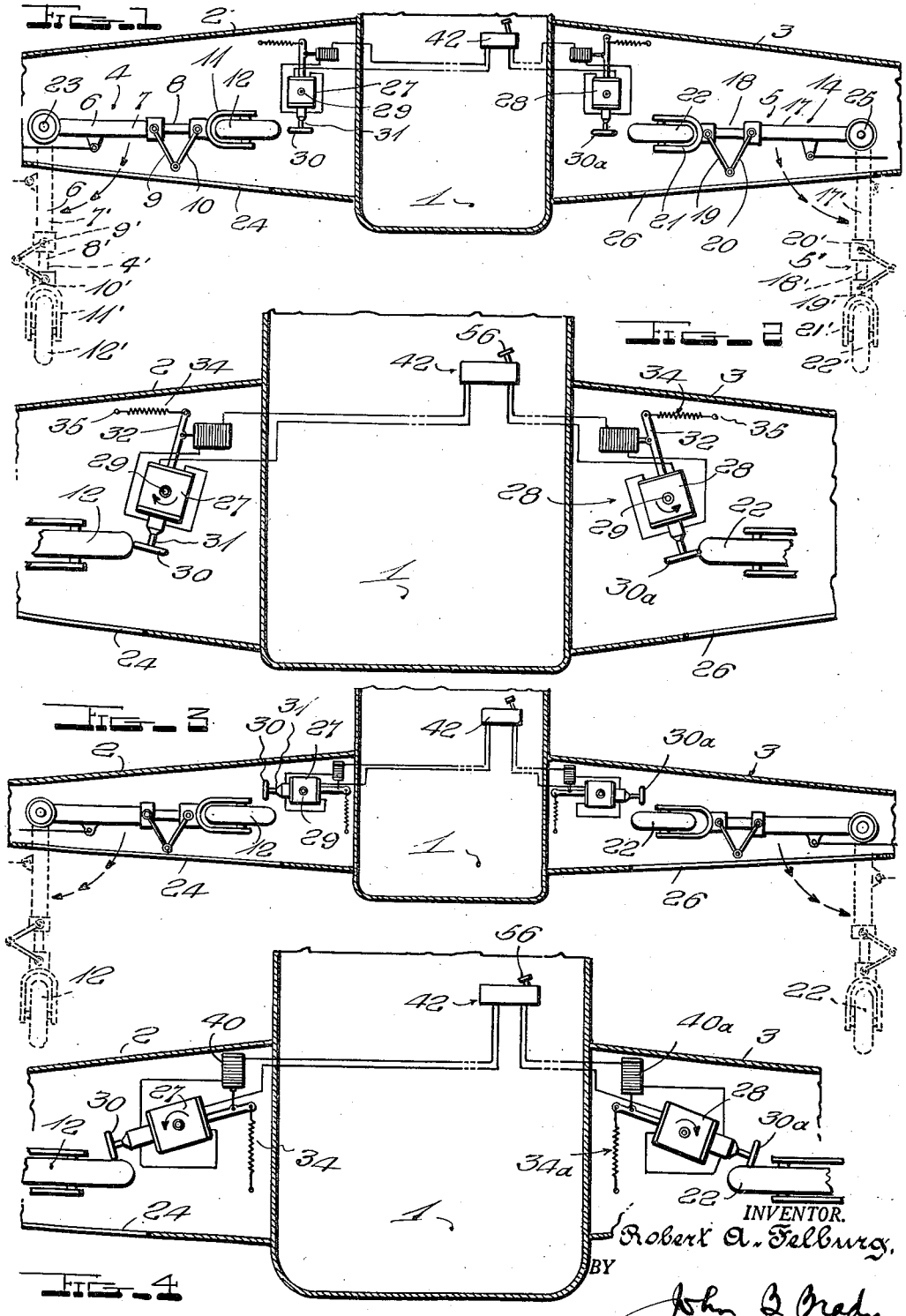
INVENTOR.
Robert A. Felburg,
BY
John B. Brady
ATTORNEY

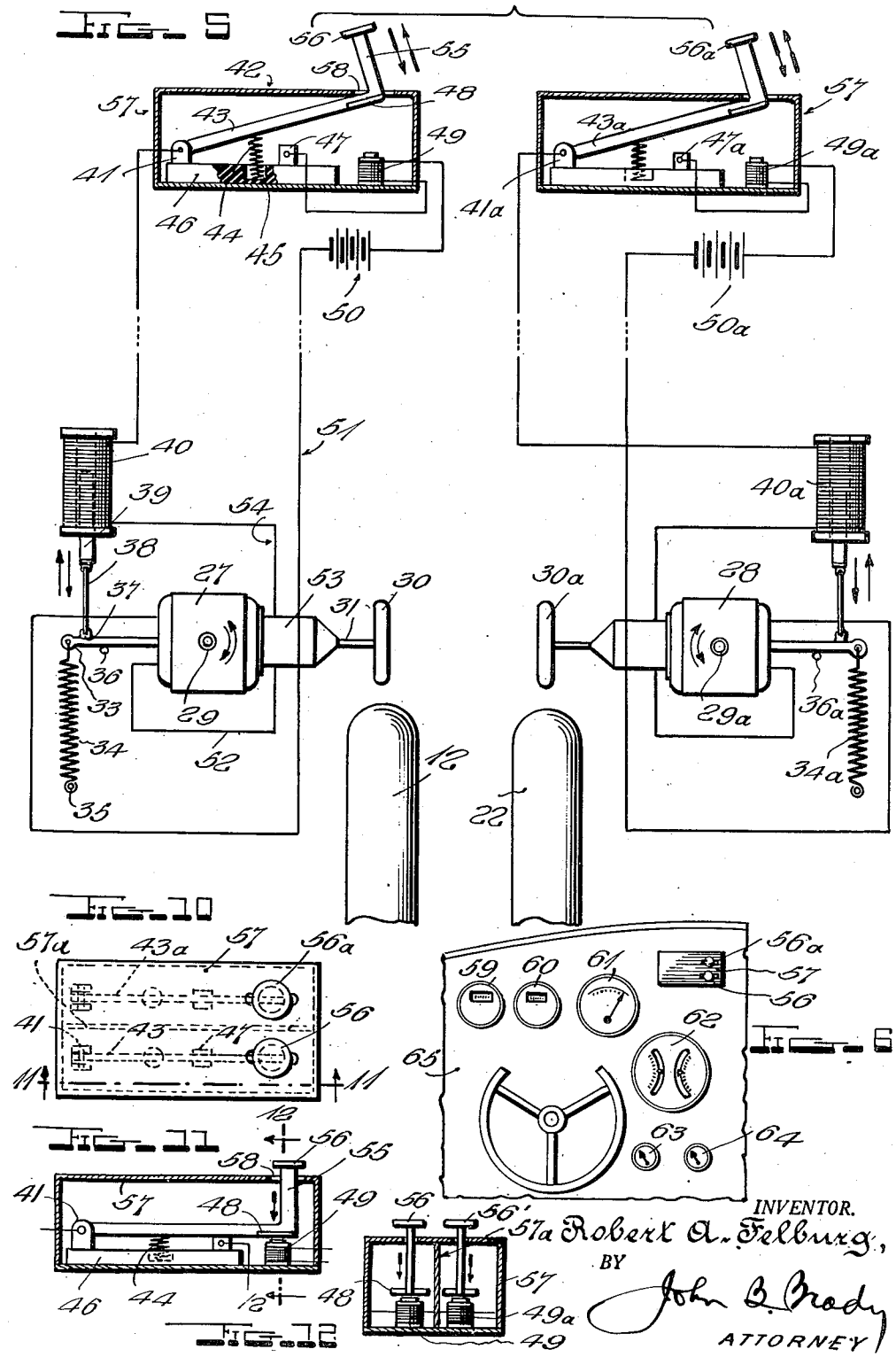

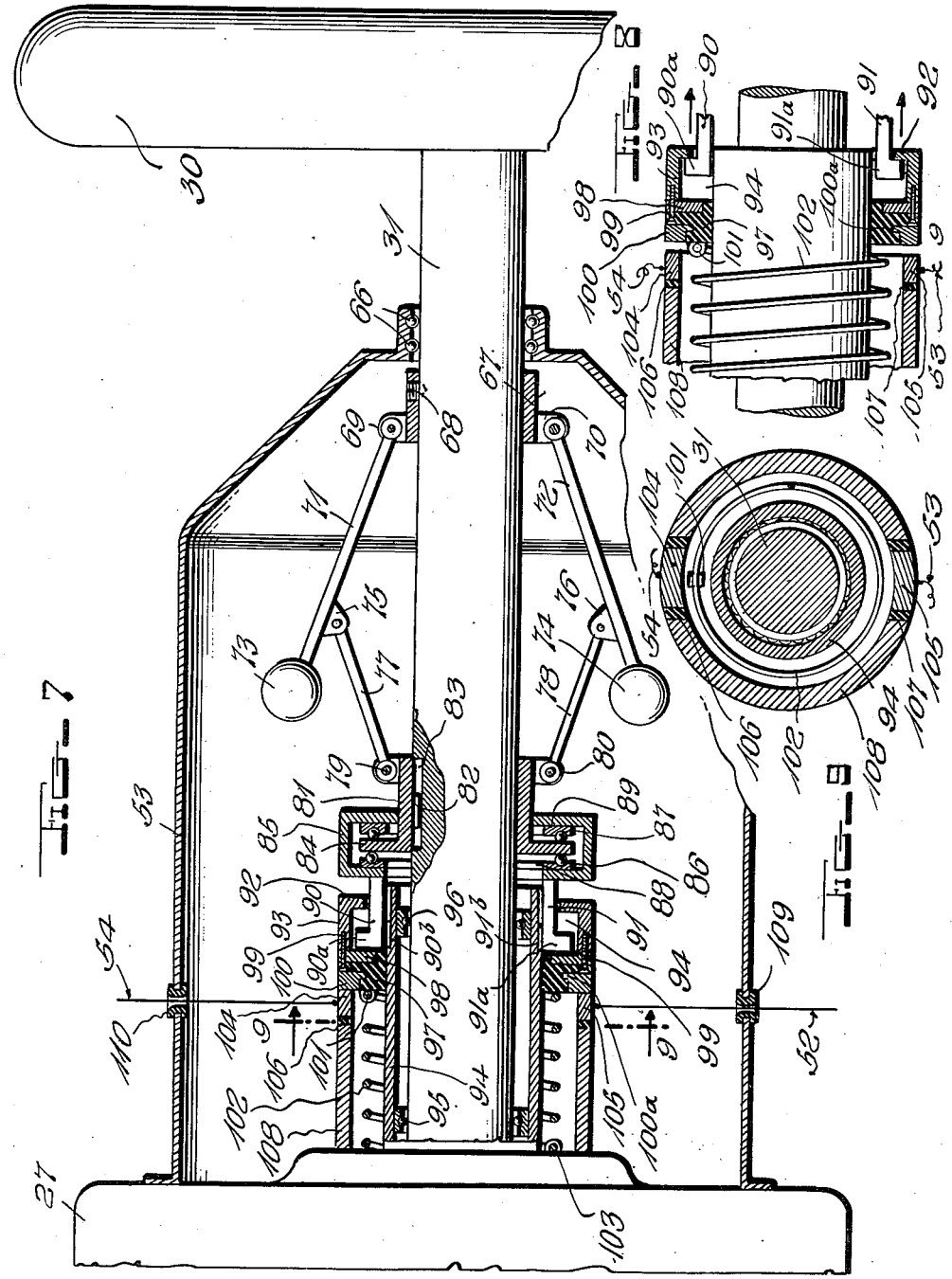

Patented Apr. 30, 1946

2,399,218

UNITED STATES PATENT OFFICE 2,399,218

AIRCRAFT LANDING GEAR

Robert A. Felburg, Newark, N. J.

Application September 7, 1943, Serial No. 501,472

12 Claims. (Cl. 244—103)

My invention relates broadly to aircraft operation and more particularly to the conditioning of aircraft landing gear for effecting landing operations.

One of the objects of my invention is to provide a system for increasing the life of aircraft landing gear by reducing the frictional wear on the treads of the tires of the aircraft landing gear by initiating the landing wheels to a speed of rotation in preparation for landing at substantially the approximate speed that the tires will contact the runways at the instant of landing.

Another object of my invention is to provide means for conditioning the wheels of aircraft landing gear for reducing wear on the treads of such wheels without necessitating reconstruction of standard aircraft landing gears in any way.

Still another object of my invention is to provide means applicable for installation upon aircraft for imparting rotative motion to the landing wheels of aircraft preliminary to landing which means may be coordinated with standard retractible aircraft landing gear without modification of the construction of the retractible landing gear.

A further object of my invention is to provide means for imparting rotative motion to the wheels of aircraft landing gear preliminary to a landing operation in which the means are rendered automatically ineffective when the landing wheels have been brought up to proper landing speed.

A still further object of my invention is to provide a construction of automatic indicator means for visually indicating to the pilot when either or both of the landing wheels on the aircraft have been brought up to proper landing speed preparatory for effecting a landing operation.

Another object of my invention is to provide a novel construction of centrifugally operated speed governing means for automatically rendering the driving means for the landing wheels of aircraft ineffective when a proper landing speed has been reached.

Other and further objects of my invention reside in the construction and arrangement of driving means for association with standard retractible aircraft landing gear for imparting rotative movement to the wheels of the standard landing gear preparatory to a landing operation as set forth more fully in the specification hereinafter following by reference to the accompanying drawings, in which:

Figure 1 schematically illustrates the application of the system of my invention to conventional aircraft landing gear, the view illustrating the normal condition while the aircraft is in flight and prior to application of the drive means to the treads of the aircraft landing wheels; Fig. 2 is a schematic view of the arrangement illustrated in Fig. 1 but showing the position of the drive means when the pilot closes the control switches preparatory for a landing operation and for imparting rotative movement to the treads of the landing wheels; Fig. 3 is a further schematic view showing a modified arrangement of the drive means for imparting rotative movement to the wheels of the retractible aircraft landing gear by engagement of the drive means with the sides of the casings of the tires in retracted position as distinguished from engagement with the treads of the tires in the arrangement illustrated in Figs. 1 and 2; Fig. 4 is a schematic view of the arrangement shown in Fig. 3 where the pilot has operated the circuit closing means displacing the driving means to a position engaging the sides of the tire casings for imparting rotative movement thereto prior to effecting a landing operation; Fig. 5 is a diagrammatic view illustrating the control means for each wheel of the retractible landing gear in position prior to the closing of the control circuit before preparing for a landing operation; Fig. 6 is a fragmentary view showing the association of the control means with the control board of the aircraft and illustrating the manner in which the circuit closing means for each aircraft landing gear also serves as an indicator for informing the pilot when the wheels reach a proper rotative speed preparatory for landing; Fig. 7 is a side elevational view of the drive means and speed governing mechanism associated therewith with parts broken away and illustrated in section with the parts in operative position for closing the electrical circuit therethrough for all normal speeds below a predetermined excess speed; Fig. 8 illustrates the parts of the mechanism of Fig. 7 displaced under conditions of excessive speed for opening the circuit through the governor mechanism; Fig. 9 is a transverse sectional view taken substantially on line 9—9 of Fig. 7; Fig. 10 is a front elevational view of the pilot control switches and indicator mechanism which serves both as a control means for initiating the driving mechanism in operation preparatory for landing and also as a visual indicator to inform the pilot when each landing wheel is brought up to proper speed; Fig. 11 is a longitudinal sectional view taken on line 11—11 of Fig. 10 and showing the magnetic shield which is employed around the control switch and holding magnet arrangement for preventing adverse influence of the switch mechanism upon the instruments on the instrument board of the aircraft; and Fig. 12 is a transverse sectional view taken on line 12—12 of Fig. 11.

My invention is directed to an aircraft retractible landing gear of a construction designed to save and conserve the rubber tires of the aircraft landing gear. I provide mechanism which may be installed on aircraft of any standard type without change to the retractible landing gear. The mechanism of my invention is wholly independent of the character of construction of the retractible landing gear and is therefore generally applicable to all types of retractible landing gears. It is realized that production and manufacture of retractible landing gears involves a highly complicated and detailed problem and any change in the landing gear structure per se to produce rotation of the landing wheels is impracticable because of the necessity of freezing designs and constructions under existing manufacturing conditions. I therefore adapt the mechanism of my invention to any design of retractible landing gear without change in the landing gear construction. I provide friction drive wheels located adjacent the landing gear wheels when moved to retracted positions with means for effecting engagement between the friction drive wheels and the landing wheels of the aircraft landing gear for imparting rotation to the landing wheels for bringing the landing wheels up to speed so that the wheels are rotating at approximately landing speed when the aircraft initially contacts the ground. The friction drive mechanism is operated under control of the pilot at a reasonable time prior to landing. The control mechanism is so arranged that the mechanism also serves as an indicator to the pilot when the landing wheels have been brought up to required speed so that the friction drive mechanism is withdrawn from engagement with the landing wheels at the proper time and the pilot thus informed of the fact that both landing wheels are spinning at the proper speed for effecting a safe landing.

As an example of the application of my invention, certain types of bombers cannot land at an air speed of less than 120 miles per hour so that in order to effect a safe landing, the bomber is normally piloted from an air speed of say something above 160 miles per hour in an effort to bring the bomber down to a safe landing speed. The pilot may attempt to come in at an air speed of approximately 140 miles per hour. Approximately ten minutes before landing, the pilot may be informed from the landing field of a 30 mile per hour wind over the field. As the pilot must land into the wind, he mentally subtracts 30 from 140 and knows that his landing speed should be approximately 110 miles per hour. He then closes the circuits to the friction drive means of my invention, operating to bring up the landing wheels to speed safe for landing. The friction drive means are automatically controlled so that should the landing wheels exceed the required landing speed, the driving force is removed and the wheels allowed to spin preparatory to landing, the pilot being informed of the rotating condition by indicator means on the control board in the pilot's position.

The friction drive mechanism comprises a small electric motor installed within each wing adjacent the position in which the landing gear is retracted. The small electric motor located adjacent each wheel operates a friction drive wheel which may be moved into engagement with the tire of the landing wheel either with respect to the tread or the side of the casing for bringing the landing wheel up to speed. The movement of the position of the motor is effected by magnetic control means energized under control of the pilot from a control position on the pilot's control panel. The motor carries a centrifugally operated switch that is designed to open the circuit to the driving motor when the driving speed reaches a safe landing speed whereupon the control means, which also serves as a visual indicator, moves to a release position thereby informing the pilot with respect to the safe rotating speed of the landing wheels. A separate friction drive system is provided for each landing wheel because of differences in friction and other conditions which may result in one landing wheel reaching landing speed prior to the other landing wheel. The landing wheels may attain a speed above landing speed in just a few minutes of application of the friction driving means to the landing wheels. The friction drive means are then moved out of engagement with the landing wheels and the driving motors cut off. Then, approximately five minutes before landing, the landing wheels are lowered out of the wings into extended position for landing and by the time the plane is ready to contact the ground, the landing wheels will have slowed to approximately landing speed. For example, if the landing wheels have been driven to attain a speed of 200 miles per hour, the wheels may be rotating at 160 miles per hour at the time the plane is ready to land. If the plane lands at 150 miles per hour, then even though the wheels may be rotating at either 10 or 15 miles per hour slower or faster, very little rubber is worn from the landing wheels in view of the relatively small friction wear which occurs in the instant of contact between the tires and the runway.

Referring to the drawings in more detail, reference character 1 schematically represents the chassis of the aircraft having wing structures 2 and 3 projecting therefrom. The conventional retractible and extendable landing gear is represented in Fig. 1 in full lines at 4 and 5 in retracted position and is shown in extended positions in dotted lines at 4' and 5'.

The retractible and extendable landing gear 4 is of conventional form and has been shown as including a strut 6 of the telescopic Oleo type having two telescopically associated relatively slidable portions 7 and 8 and interconnecting links 9 and 10. The strut terminates in a yoke 11 which journals the wheel represented at 12. The same parts have been designated by primed characters 7', 8', 9', 10', 11', and 12' in the extended position of the landing gear shown in dotted lines. The retractible landing gear 5 includes corresponding parts constituted by strut 14 of the telescopic Oleo type having two telescopically associated relatively slidable portions 17 and 18 controlled by links 19 and 20 and supporting yoke 21 in which landing wheel 22 is journalled. The dotted line position of the retractible landing gear shows the corresponding parts indicated by primed characters at 17', 18', 19', 20', 21' and 22'. The retractible and extendable landing gear 4 is pivoted about axis 23 and is movable into and out of the wing structure 2 through opening 24 beneath the wing structure 2. The retractible and extendable landing gear 5 is pivoted at 25 and is movable into and out of wing structure 3 through opening 26.

Within each of the wing structures I provide an electric motor mechanism indicated at 27 and 28. Each electric motor mechanism is pivotally mounted within the wing structure adjacent the retracted position of the aircraft landing gear. Electric motor mechanism 27 is pivoted at 29 within the wing structure for limited rocking movement sufficient to effect frictional driving engagement between friction wheel 30 driven by shaft 31 of the electric motor system and the landing wheel of the retractible and extendable landing gear. In Figs. 1 and 2, I show the two extreme positions of the electric motor drive mechanism, Fig. 1 illustrating the electric motor drive mechanisms in normal rest condition with friction drive wheel 30 disengaged by landing wheel 12 while Fig. 2 shows friction drive wheel 30 engaged with landing wheel 12. This restricted angular movement is allowed by reason of the mounting of the electric motor mechanism as shown more clearly in Fig. 5 where the the normal position for electric motor mechanism 27 is shown. An actuating rod 32 extends from the frame of the electric motor mechanism 27 and provides a connection at its extremity shown at 33 for spring 34 which is fixed relatively to the wing structure as represented at 35. A stop 36 provides an abutment for rod member 32 whereby the electric motor mechanism 27 is normally maintained in a position in which friction wheel 30 is disengaged from landing wheel 12. Rod member 32 also provides a connection at 37 through link 38 with an armature member 39 of solenoid 40. Solenoid 40 has an electromagnetic winding thereon which is electrically connected at one end to the terminal 41 of the control switch and indicator represented at 42. The control switch and indicator 42 includes a single throw knife blade member 43 pivoted with respect to terminal 41 and normally spring pressed to open position by spring member 44 seated in socket 45 in the insulated base 46 of the control switch and indicator. The insulated base 46 carries a jaw-type contact 47 into which the switch blade 43 is adapted to be pressed against the action of spring 44. The switch blade 43 carries an armature member 48 thereon which is adapted to be aligned with the electromagnet represented at 49 which operates as a holding magnet. Electromagnet 49 is electrically connected in series with source of potential represented at 50 from which a circuit is completed through conductor 51 to the windings of electric motor mechanism 27 and thence through conductor 52 to the centrifugally operated switch contact mechanism arranged within housing 53, shown more clearly in Figs. 7–9, of the electric motor mechanism 27. The circuit continues from the centrifugally operated switch mechanism in housing 53 through conductor 54 to the solenoid winding 40.

It will be observed that the switch blade 43 terminates in an operating handle 55 with a knob 56 on the end thereof extending outside the casing 57 of the control switch and indicator through aperture 58. The casing 57 constitutes a magnetic shield including a shielding partition 57a for preventing any magnetic influence from holding magnet 49 from affecting the meters and indicators 59, 60, 61, 62, 63, 64, etc. associated on the pilot's control board 65 shown schematically in Fig. 6. The control switch and indicator remains in closed position so long as holding magnet 49 is energized. Holding magnet 49 remains energized so long as the driving motor mechanism is being brought up to speed and is maintained at a speed below excessive speed as determined by the governing mechanism explained in Figs. 7–9. It will be seen that the energization of solenoid 40 brought about by closing circuit from source 50 through switch blade 43 and contact 47 serves to angularly shift the frame 27 of the motor mechanism about pivot 29 for moving friction drive wheel 30 into engagement with landing wheel 12. When the landing wheel 12 exceeds the desired landing speed the governing mechanism within housing 53 opens the circuit through solenoid 40 allowing the frame of the electric motor mechanism to swing to the position shown in Fig. 5 disengaging friction drive wheel 30 from landing wheel 12 and opening the circuit to the driving motor windings through switch blade 43 and contact 47 and opening the circuit through holding magnet 49. Switch blade 43 is thus pushed open by spring 44, knob 56 projecting forward on the pilot's control board and indicating to the pilot that the landing wheel 12 has been brought up to a safe landing speed.

The landing wheel 22 is provided with an arrangement of electric motor drive mechanism similar to the drive explained for landing wheel 12. The reason for the independent control circuit for the drive mechanism for landing wheel 22 is to provide means for bringing up the two landing wheels to proper speed independently of variations in friction or differences in journalling arrangements. The parts for the two independent controls are similar and I have accordingly indicated the several parts by corresponding reference characters with subscripts $a$ applied thereto as shown. It will be understood however that the power source 50a is the same power source as that indicated at 50 and that two independent power sources are not necessary. Moreover the control switches and indicators 43 and 43a of each are mounted in the same magnetically shielded casing 57 and I have accordingly indicated the magnetic shield 57 by the same reference character in each portion of the view illustrated in Fig. 5. The control members and indicators 56 and 56a each project from the magnetically shielded housing on the pilot's control panel 65 as shown in Fig. 6 so that the pilot will be informed when one landing wheel 12 is brought up to proper landing speed and will also be informed when the other landing wheel 22 is brought up to proper landing speed by the positions of the control members and indicators 56 and 56a. In each instance, as the circuit is opened between the switch plates 43 and contact 47 and switch plate 43a and contact 47a, the electric motor driving mechanism 27 and 28 is angularly shifted about pivots 29 and 29a, thus removing friction drive wheels 30 and 30a from engagement with landing wheels 12 and 22.

The disengaging position for the friction driving wheels 30 and 30a with respect to landing wheels 12 and 22 is illustrated in Fig. 1 whereas the engaged position between friction driving wheels 30 and 30a with the threads of tires on landing wheels 12 and 22, respectively, is illustrated in Fig. 2.

In Figs. 3 and 4 I have illustrated the electric motor drive mechanism in the wing structures of the aircraft for frictionally driving the landing wheels 12 and 22 by engagement with the side walls of the tire casings 12 and 22 instead of with the treads of the tires. Fig. 3 shows the frictional driving wheels 30 and 30a in normal position disengaged from the walls of the tire casing of the landing wheels 12 and 22, whereas Fig. 4 shows the electric motor driving mechanisms 27 and 28 disengaged by the closing of the electric control circuits to effect engagement between friction driving wheels 30 and 30a with the side walls of the casings of the tires 12 and 22. As the landing wheels are brought up to proper landing speed, the electric motor driving mechanisms are restored to the positions illustrated in Fig. 3 by the action of springs 34 and 34a. The solenoids 40 and 40a are deenergized by opening of the series control circuit between switch plate 43 and contact 47 and switch plate 43a and contact 47a upon deenergization of holding magnets 49 and 49a due to an overspeed condition at the centrifugal switch control mechanism illustrated in Figs. 7–9.

Referring to Figs. 7–9, the motor shaft 31, which extends from the electric motor 27, carries the friction drive wheel 30 for engagement with the landing wheels 12 or 22. The shaft extends through a housing 53 having an anti-friction bearing connection with shaft 31 as represented at 66. The housing 53 thus serves as a dust and moisture-tight cover for the precision mechanism contained therein.

The speed governing mechanism includes a sleeve member 67, secured by set screw 68 to a selected position on shaft 31. The position of sleeve 67 may be adjusted longitudinally of the shaft for increasing or decreasing the speed at which the governor mechanism operates to open the series circuit to the driving motor mechanism. Sleeve 67 is provided with pairs of radially projecting lugs represented at 69 and 70, forming pivot means for arms 71 and 72 which carry centrifugally operated weights 73 and 74 on the ends thereof. Arms 71 and 72 have lugs 75 and 76 extending inwardly therefrom forming pivotal connections for link members 77 and 78 which pivotally connect with radially extending lugs 79 and 80, carried by longitudinally slidable sleeve member 81. The longitudinally slidable sleeve member 81 has an inwardly projecting key 82 thereon, which is longitudinally slidable in a keyway or slot 83 formed in shaft 31. As the weights 73 and 74 swing outwardly under centrifugal force due to increased speed of shaft 31 and friction drive wheel 30 in frictional engagement with landing wheel 12 or 22, a pull is exerted on sleeve 81 displacing sleeve 81 longitudinally of shaft 31. Sleeve 81 cannot turn relatively to shaft 31 but is only slidable longitudinally with respect thereto. The sleeve 81 has a radially extending flange 84 on the end thereof opposite to the end at which links 77 and 78 pivotally connect. The faces of flange 84 provide slidable connection with collar member 85 through the ball races indicated at 86 and 87 secured in ball race plates 88 and 89. The collar member 85 has a pair of longitudinally extending arms 90 and 91 with hook-shaped ends 90a and 91a for engagement with the inwardly extending flange 92 of collar member 93. Collar member 93 has an annular space therein indicated at 94, within which the hook-shaped ends 90a and 91a of members 90 and 91 are free to be displaced longitudinally within definite limits. Thus a lost motion connection is provided between collar member 93 and the system of centrifugal weights including weights 73 and 74.

Sleeve member 94 projects from the housing of the motor 27 and terminates shortly beyond the closed circuit position for governing mechanism and serves as a support and guide for the parts to which the collar assembly 93 is connected. The extremity of the sleeve 94 is grooved at 90b and 91b to allow the longitudinal movement of the arms 90 and 91 under centrifugal action of the switch control mechanism. Anti-friction bearings 95 and 96 are provided between shaft 31 and sleeve member 94 for maintaining accurate alignment of the parts and reducing friction to a minimum.

The collar assembly 93 has an insulated bushing 97 and a ring member 98 secured thereto by screw members 99. Insulated bushing 97 slidably connects with sleeve member 94 and may be displaced longitudinally thereof. The insulated bushing 97 serves as an insulated support for the annular conductive ring member 100. The securing screws 99 are countersunk in insulated bushing 97 and thus do not electrically connect with ring member 100. The ring member 100 is provided with an inwardly extending flange 100a fitting within an annular groove in insulated bushing 97 for forming a substantial mechanical connection therewith while at the same time maintaining ring member 100 in substantial insulated relation to all parts of the collar assembly 93. There is embedded in insulated bushing 97 an eyelet member 101 in insulated relation to ring member 100, ring member 98 and the other parts of the collar assembly 93. The eyelet 101 provides a connection for coil spring 102 which is secured at the other end 103 to the frame of the motor 27. Coil spring 102 tends to continuously draw the collar assembly 93 toward the motor frame 27 for maintaining the face of conductive annular ring 100 in electrical connection with the contact segments 104 and 105 forming the terminals for the series circuit through conductors 52 and 54 in the series control path explained in Fig. 5. The segments 104 and 105 are insulatingly mounted as represented at 106 and 107 in the extremity of the tubular frame member 108 that projects from the motor frame 27. The conductors 52 and 54 enter opposed sides of housing 53 through insulated bushings 109 and 110 as shown and electrically connect with segments 105 and 104.

Under normal conditions of rotation, coil spring 102 maintains the annular conductive ring 100 in contact with the segments 104 and 105. However as the speed increases, the centrifugal weights move outwardly, displacing sleeve 81 longitudinally of the shaft system until a position is reached in which the hook-shaped ends 90a and 91a of arms 90 and 91 pull the collar assembly 93 further away from the end of tubular member 108, as represented in Fig. 8, separating the annular conductive ring member 100 from electric circuit connection with segments 104 and 105, thus opening the series circuit path illustrated in Fig. 5 which results in the deenergization of holding magnet 49. Spring 44 then forces plate 43 to be disengaged from electric circuit connection with contact 47, thereby opening the series circuit path to solenoid 40 and to the driving motor 27. The motor thus shuts down and coil spring 44 angularly shifts the motor out of position so that friction drive wheel 30 is disengaged from the landing wheel 12. This same series of steps occurs with respect to landing wheel 22 and its associated control mechanism. The pilot is at once informed, despite the fact that the landing wheels are below the aircraft and out of the range of the pilot's vision, of this existing condition by the indicators 56 and 56a which are visually displaced on the pilot's control panel 65 as represented in Fig. 6.

For purposes of explaining the principles of my invention, I have shown only one method of folding the landing gear into the wings of the aircraft. However, it will be understood that my invention is equally applicable to the various systems employed in retractible landing gear where the wheels may fold inwards, outwards, backwards with a half twist, into wells in the wings or straight back into space in the engine nacelles. It will accordingly be understood that my invention is equally applicable to any of the various constructions of retractible landing gears.

I have shown individual motors for driving the landing wheels when in retracted position. It will be understood however that this arrangement is shown for purposes of illustrating my invention and that other sources of power may be used than electric motors. In certain instances it is desirable to transmit the driving force from some auxiliary motor in the plane in order to save the additional weight of two motors. On some differently designed airplanes it is possible to hook up the same pivotally mounted angularly shiftable friction wheels to a near-by auxiliary motor by means of a suitable extension. A belt drive may also be employed from mechanism driven from the main engine if desired by which the friction wheels which are moved into contact with the landing wheels may be driven.

I have discovered that many of the heavier bombers develop trouble with what is apparently weak landing gears. The stronger the landing gear the heavier it must be. In order to conserve weight, the landing gear on some planes is not too strong. There have been many cases where heavy planes come in for a landing and the landing gear folds up under the load.

Each wheel on certain bombers weighs almost 600 pounds. In other words, the plane comes in with idle landing wheels that weigh over half a ton. The instant after they hit the ground, that half ton of dead weight is spinning at 120 M. P. H. I believe this is the shock that cracks the landing gear. If the wheels were rolling along at the same speed at which the plane was landing, in accordance with my invention, there should be very little shock to the landing gear.

The giant cargo planes and super transports that are now being designed for production in the very near future may develop even further landing gear troubles because of their terrific weights.

My invention provides that safety factor necessary to avoid crack-up of landing gears by eliminating the terrific strains involved in the landing of such heavy aircraft. Moreover, when such heavy craft makes an abrupt landing with half worn tires, the tires will sometimes blow and upset the plane. There have been a number of such accidents. These could be avoided if the wheels were spinning prior to landing. Furthermore, the use of my invention provides considerable saving in tires which is so essential under existing conditions in which the rubber shortage is so acute.

While I have described my invention in certain preferred embodiments, I desire that it be understood that modifications may be made and that no limitations upon my invention are intended other than may be imposed by the scope of the appended claims.

What I claim as new and desire to secure by Letters Patent of the United States is as follows:

1. An aircraft landing system comprising in combination with the wing structure of an aircraft including landing gear having rotatable landing wheels retractible into and extensible out of said wing structure, pivotally mounted angularly shiftable electrically driven motor devices disposed in said wing structure in positions adjacent the retracted position of the landing gear, friction wheels driven by said motor devices, means for angularly shifting said motor devices for effecting engagement between said friction wheels and said landing wheels for rotatably driving said landing wheels at approximately landing speed while said landing gear is in retracted position within said wing structure.

2. An aircraft landing system comprising in combination with the wing structure of an aircraft including landing gear having rotatable landing wheels retractible into and extensible out of said wing structure, pivotally mounted angularly shiftable electrically driven motor devices disposed in said wing structure in positions adjacent the retracted position of the landing gear, friction wheels driven by said motor devices, means for angularly shifting said motor devices for effecting engagement between said friction wheels and the treads of said landing wheels for driving said landing wheels at landing speed while said landing gear is in retracted position within said wing structure prior to extension thereof from said wing structure.

3. An aircraft landing system comprising in combination with the wing structure of an aircraft including landing gear having rotatable landing wheels retractible into and extensible out of said wing structure, pivotally mounted angularly shiftable electrically driven motor devices disposed in said wing structure in positions adjacent the retracted position of the landing gear, friction wheels driven by said motor devices, means for angularly shifting said motor devices for effecting engagement between said friction wheels and the sides of said landing wheels for driving said landing wheels at approximately landing speed while said landing gear is in retracted position within said wing structure prior to extension thereof from said wing structure.

4. Aircraft landing mechanism comprising extendable and retractible aircraft landing gear including rotatable landing wheels, separate driving motors mounted adjacent the retracted position of said landing gear, a friction driving wheel individual to each of said driving motors and engageable with the respective landing wheels for imparting rotary movement to said landing wheels while said landing gears are in retracted position, and means for manually starting each of said driving motors and additional means for automatically stopping said driving motors when said landing wheels reach a predetermined speed of rotation.

5. Aircraft landing mechanism comprising extendable and retractible aircraft landing gear including rotatable landing wheels, separate driving motors mounted adjacent the retracted position of said landing gear, a friction driving wheel individual to each of said driving motors and engageable with the respective landing wheels for imparting rotary movement to said landing wheels while said landing gears are in retracted position, means individual to each of said driving motors for manually starting said motors, indicators for representing the running condition of said motors, and automatic means for interrupting the operation of said motors at a predetermined speed of operation of said landing wheels.

6. An aircraft landing system comprising in combination with the wing structure of an aircraft including landing gear having rotatable landing wheels retractible into and extensible out of said wing structure, pivotally mounted angularly shiftable electrically driven motor devices disposed in said wing structure in positions adjacent the retracted position of the landing gear, friction wheels driven by said motor devices, means for angularly shifting said motor devices for effecting engagement between said friction wheels and said landing wheels for rotatably driving said landing wheels at approximately landing speed while said landing gear is in retracted position within said wing structure, and means for manually starting said motor devices and operating said aforesaid means for shifting said motor devices to positions on which the friction wheels engage said landing wheels, and separate means for automatically interrupting the operation of said motor devices and restoring said motor devices to normal position when said landing wheels reach a predetermined speed of rotation.

7. An aircraft landing system comprising in combination with the wing structure of an aircraft including landing gear having rotatable landing wheels retractible into and extensible out of said wing structure, pivotally mounted angularly shiftable electrically driven motor devices disposed in said wing structure in positions adjacent the retracted position of the landing gear, friction wheels driven by said motor devices, means for angularly shifting said motor devices for effecting engagement between said friction wheels and said landing wheels for rotatably driving said landing wheels at approximately landing speed while said landing gear is in retracted position within said wing structure, means for manually starting said motor devices and operating said aforesaid means for shifting said motor devices to positions on which the friction wheels engage said landing wheels, separate means for automatically interrupting the operation of said motor devices and restoring said motor devices to normal position when said landing wheels reach a predetermined speed of rotation, and visual indicator means associated with said first mentioned means for indicating the running or idle condition of said motor devices.

8. An aircraft landing system comprising in combination with the airfoils of an aircraft, landing gear retractible into and extendable out of said airfoils, rotatable wheels carried by said landing gear, an electrically driven motor mounted within each airfoil adjacent the retracted position of said landing gear, a friction drive wheel driven by said motor and engageable with said wheel in the retracted position of said landing gear for driving the landing wheel at approximately landing speed prior to the extension of said landing gear to landing position, a centrifugally operated switch connected with each of said friction drive wheels and disposed in series with the associated electrically driven motors for opening the motor circuits when said rotatable wheels reach a predetermined speed of rotation.

9. An aircraft landing system comprising in combination with the wing structure of an aircraft including landing gear having rotatable landing wheels retractible into and extensible out of said wing structure, pivotally mounted angularly shiftable electrically driven motor devices disposed in said wing structure in positions adjacent the retracted position of the landing gear, friction wheels driven by said motor devices, means for angularly shifting said motor devices for effecting engagement between said friction wheels and said landing wheels for rotatably driving said landing wheels at approximately landing speed while said landing gear is in retracted position within said wing structure, an electric control circuit including a power source, a series circuit through each motor device and including in series: a main switch, a holding magnet for said main switch connected in said series circuit, a centrifugally operated switch driven by said motor device, and a control solenoid for controlling the operation of said first mentioned means for angularly shifting each motor device for effecting engagement between the associated friction wheel and the associated landing wheel.

10. An aircraft landing system comprising in combination with the wing structure of an aircraft including landing gear having rotatable landing wheels retractible into and extensible out of said wing structure, pivotally mounted angularly shiftable electrically driven motor devices disposed in said wing structure in positions adjacent the retracted position of the landing gear, friction wheels driven by said motor devices, means for angularly shifting said motor devices for effecting engagement between said friction wheels and said landing wheels for rotatably driving said landing wheels at approximately landing speed while said landing gear is in retracted position within said wing structure, an electric control circuit including a power source, a series circuit through each motor device and including in series: a main switch, a holding magnet for said main switch connected in said series circuit, a centrifugally operated switch driven by said motor device, a control solenoid for controlling the operation of said first mentioned means for angularly shifting each motor device for effecting engagement between the associated friction wheel and the associated landing wheel, and indicator means for visually indicating the running and idle condition of said motor devices.

11. An aircraft landing system comprising in combination with the wing structure of an aircraft including landing gear having rotatable landing wheels retractible into and extensible out of said wing structure, pivotally mounted angularly shiftable electrically driven motor devices disposed in said wing structure in positions adjacent the retracted position of the landing gear, friction wheels driven by said motor devices, means for angularly shifting said motor devices for effecting engagement between said friction wheels and said landing wheels for rotatably driving said landing wheels at approximately landing speed while said landing gear is in retracted position within said wing structure, an electric control circuit including a power source, a series circuit through each motor device and including in series: a main switch, a holding magnet for said main switch connected in said series circuit, a centrifugally operated switch driven by said motor device, a control solenoid for controlling the operation of said first mentioned means for angularly shifting each motor device for effecting engagement between the associated friction wheel and the associated landing wheel, and spring means for restoring said motor devices to idling position with the friction wheels out of engagement with said landing wheels when said series circuit is interrupted.

12. Aircraft landing mechanism comprising extendable and retractible aircraft landing gear including rotatable landing wheels, separate electrically driven motors mounted adjacent the retracted position of said landing gear, a friction driving wheel individual to each of said driving motors and engageable with the respective landing wheels for imparting rotary movement to said landing wheels while said landing gears are in retracted position, a motor control circuit, a centrifugally operated switch driven by each of said motors, each switch including circuit opening means disposed in said motor control circuit and operative upon over speed conditions of said landing wheels to open the motor control circuits for interrupting the imparting of rotating motion to said landing wheels.

ROBERT A. FELBURG.